Patented Feb. 16, 1926.

1,573,765

UNITED STATES PATENT OFFICE.

CHARLES N. FORREST, OF RAHWAY, NEW JERSEY, ASSIGNOR TO THE BARBER ASPHALT COMPANY, OF PHILADELPHIA, PENNSYLVANIA, A CORPORATION OF WEST VIRGINIA.

GILSONITE PRODUCTS.

No Drawing. Continuation of application Serial No. 318,536, filed August 19, 1919. This application filed September 19, 1922. Serial No. 589,269.

*To all whom it may concern:*

Be it known that I, CHARLES N. FORREST, a citizen of the United States, and a resident of Rahway, in the county of Union and State of New Jersey, have invented certain new and useful Improvements in Gilsonite Products, whereof the following is a specification.

My invention relates to gilsonite products and their manufacture, and its object is the production from gilsonite of various useful substances in a commercially practicable and economical way. The novelty of my invention resides not only in my processes and methods of manufacture, but extends, also to some of the substances obtained, which are in themselves new.

As to certain divisible common subject matter, my present application is a continuation of my application, Serial No. 318,536, filed August 19, 1919, which was itself, likewise, in part a continuation of my application, Serial No. 195,721, filed October 10, 1917, under the title "Liquid hydrocarbon".

Gilsonite is a natural solid bitumen, of well known physical properties, including a peculiar, characteristic concoidal fracture, found principally in certain sections of Utah. As compared with other natural bitumens in their native state, it is remarkable for its very high degree of purity. Its specific gravity at 77° F. varies over a range of, approximately, 1.040 to 1.056. It has been used as an ingredient in paints and varnishes; in paving, waterproofing, and roofing compounds; and in rubber manufacture.

Of the chemical nature or possibilities of gilsonite, practically nothing further is known. Scientific investigations heretofore attempted have been perfunctory, abortive and inconclusive; and, until my invention, exploitation commercially has not even been attempted.

The confusion and vagueness of the world's information regarding gilsonite are well illustrated by two published accounts: one in a paper entitled "Investigation of Utah gilsonite, a variety of asphalt", read June 18, 1895, by William C. Day, of Swarthmore College, before the Chemical Section of the Franklin Institute (published in its Journal Vol. 140, pp. 221–237, September 1895); and the other in pp. 200–203 of a book entitled "The Modern Asphalt Pavement", by Clifford Richardson (then director of the New York Testing Laboratory, and previously principal assistant chemist in the U. S. Department of Agriculture and inspector of asphalt and cement of the District of Columbia), published in 1905 by John Wiley & Sons, New York. While comparison of Day's paper with Richardson's summary (especially pp. 202–203) shows that many of Day's results and inferences were not credited, the two accounts do agree entirely in regarding the possibility of useful products from gilsonite as a pure matter of speculation.

Day's work avowedly failed of attaining the definite information that he sought regarding the nature of gilsonite; and his own tentative conclusions go very little further than that distillation of gilsonite is unpromising, and that future work on the substance should be along the lines of direct treatment with reagents such as nitric and sulphuric acids according to a method "outlined" as a result of his investigation. While the indefiniteness of his descriptions makes any attempt to repeat or reproduce his work quite futile, such data and results as he does report, nevertheless, show very clearly that he could not really have been working with true gilsonite at all,—except, perhaps, in admixture with dominant amounts of other substances. Thus he states that the material on which he worked was lighter than water, whereas in fact gilsonite is heavier; that when heated, his material gave a final, irreducible residue of some 43%, whereas gilsonite yields no more than 30% of residue; that all the volatile matter driven off by distillation was condensable by water cooling, whereas gilsonite yields such substantial proportions as some 15% of vapor not so condensable, including some 13% of well known gases; that no solid separated out in any of his redistillations, whereas under the conditions of some of them he would have obtained from gilsonite a hard, crystalline wax, higher melting than paraffine; that his material contained but 0.32% of both oxygen and nitrogen together, whereas gilsonite contains about 2 to 3% of nitrogen alone; and that his refining operations consumed a proportion of the oil treated that is almost unbelievable. It is also noteworthy that he does not mention the peculiar conchoidal fracture so characteristic of gilsonite.

While the real nature of the material with which Day worked cannot, of course, be known, it is worthy of remark that a great variety of bitumens besides gilsonite occurs in Utah, and that their presence in Day's material might account for the low specific gravity of the latter, as well as for some of his results that are absolutely at variance with the real properties of gilsonite.

In a later paper (Am. Philosophical Society, Proc., Vol. 37, pp. 171–174, 1898), Day tells of making, by distillation of pine sawdust and fresh herring, a substance which he found practically indistinguishable from native gilsonite.

I have discovered that by suitable treatment,—giving rise to phenomena and results quite different from anything indicated by Day, and itself also very different in many respects,—gilsonite can be made the basis for the production of a great variety of commercially useful products, mostly of a character and with properties so far from Day's account (or from any known products, for that matter) as to demonstrate their essential novelty very clearly. It is possible, I have found, to do this in such wise that almost the entire substance of gilsonite will reappear in the form of useful products. All this will be fully elucidated by my description hereinafter of the best practical mode of procedure for the purposes of my invention at present known to me, and of its results.

While physically homogeneous and of relatively simple composition, chemically gilsonite is highly complex. Not only does chemical analysis show that it contains a number of different elements, but there are many indications that its characteristic molecule (or molecules) are of very high molecular weight and of corresponding structural complexity. According to my invention, I break up or decompose this complex material in such a way that there may be obtained and segregated or collected separately a number of different products and classes of products. Of these, part have the character of permanent gases or vapors uncondensable at ordinary temperatures and pressures; part are vapors condensable as liquid, mainly oil; and part are in the form of solid coke. The gaseous portion is of such a character as to be at once serviceable as fuel or as an illuminant; but it is of considerable complexity, and can be made to yield nitrogenous and other useful products without impairment of its combustive utility. The coke is not only susceptible of direct use as fuel, or of conversion into fuel gas (of somewhat different character from that obtained as above, but has a nitrogenous content that can readily be released and segregated in useful form (even as a simple incident of gasification of the coke) if the antecedent operation has been appropriately conducted.

The liquid products present the utmost variety and complexity, and have, moreover, a nitrogenous content very readily segregated in useful form. Though the mixture or aggregate of them resulting from the decomposition is, indeed, at once directly utilizable, their specific properties are so diverse that they can generally be utilized to best advantage when more or less separated from one another,—or, at least, divided up into relatively homogeneous lots or fractions, so to speak. These fractions may be used directly; or further treated to bring them into a more useful state; or made the basis or raw material for the preparation of other valuable products.

In its more complete or integrated form (designed to recover or utilize the entire substance of gilsonite as fully and advantageously as may be), my process involves a first main step that is most readily carried out by progressive distillation of the gilsonite, destructive in character, together with further or subsidiary main steps that may be carried out by combustion of the coke from the initial distillation, and by redistillation of the primary crude oil distillate (repeated a number of times in some cases) in the nature of fractionation or reduction. If it goes far or high enough, redistillation will usually involve some destructive action, with resultant decomposition of heavier, higher-boiling, more viscous portions or components of oil subjected thereto, and a yield of lower boiling oils freely liquid at ordinary temperatures, and ultimately some coke. Preferably, of course, the vapors from all distillations will be appropriately chilled or otherwise treated to segregate and recover various different useful components separately. From the description of my preferred mode of procedure, however, it will become apparent that various benefits and advantages of my invention can be realized even when one or more of the above-indicated steps is omitted,—and even, indeed, when the vapor from the initial distillation of gilsonite is not collected or condensed.

It may be noted as a point in the economy of my complete process that burning of the fuel products obtained as described above (the two lots or kinds of fuel gas, in particular) affords all the heat necessary for carrying out its main steps of distillation, so that the process is thus thermally balanced or self-sustaining. Another important point is that the unconsumed portion of certain reagents required or advantageously used for treatment of fractionated liquid products can be utilized completely and very advantageously in the segregation of the various lots or portions of nitrogenous products above mentioned.

The procedure which I prefer to employ is as follows:

Gilsonite as received from the mine is charged into an iron or steel still, fired with gas or oil (or otherwise suitably heated), and connected to a suitable condenser,—such as an iron pipe condenser water-cooled. Any convenient quantity of gilsonite may be charged,—say 600 pounds to several tons. The still being closed and heat applied gradually, the gilsonite will liquefy and collect in the bottom of the still, and vapor and gas evolving from it will fill the top of the still and pass over into the condenser. As the heating progresses, temperature readings should be taken from time to time on the body of vapor in the upper portion of the still, as well as on the body of liquid beneath it. (Excepting as there may be special occasion for distinguishing them, I here and hereinafter comprehend mingled gases and vapors under the single term "vapor," for the sake of brevity. Otherwise, I have applied these terms in accordance with familiar popular usage, having reference to the usual state of substances at ordinary temperatures. For convenience, I refer to various stages of operations by the corresponding temperatures of the vapor then over the undistilled residue, unless otherwise specially noted.) The effect of the progressive heating of the gilsonite is to gradually break it up and decompose it chemically, as above mentioned,—whence, mainly, the evolution of vapor. The coming off of vapor from the still begins at a temperature of some 165° F., and continues up to or even beyond coking temperatures.

It is a difficult matter to describe the process, or to determine in what order various products are formed or come off, since the coming off of particular products depends on the stability under heat of the highly complex chemical combinations amongst the constituents of gilsonite, as well as upon the boiling points of the products themselves. The matter is further complicated, no doubt, by the liberation, formation, and decomposition of intermediate products, both in the body of liquid and in the body of vapor. Speaking generally, however, and with reference to the bulk or predominant amounts of the several products, the following may be said:

In the earlier stages of the distillation, mainly oil and water vapors come off; and in the later stages, oil vapor with proportionately increased amounts of uncondensable gas. Near the end of the distillation,—sometime after the bulk of the water,—a minor but substantial amount of heavy oil vapor comes off that is condensable at relatively high temperatures, and is thick and gummy at ordinary temperatures (readily attainable by water cooling) appropriate for condensing the bulk of the total amount of oil vapor. The maximum destructive effect and evolution of gas occur just before and after the undistilled residue reaches the condition of coke,—the actual amount of gas being quite substantial at this stage as well as previously. Both at this stage and as a whole, the distillation gas has a greater proportionate nitrogenous content than that from any other hydrocarbonaceous material.

Up to the point where the vapor temperature approaches some 550° F., the distillation may be carried out as rapidly as the contents of the still can be made to absorb heat. At this point, however, some exothermic or other peculiar action occurs, so that the evolution of vapor in the still tends to become excessively rapid. Unless, therefore, the previous heating has been especially slow, it is necessary to reduce the application of heat very greatly as this critical point is approached, in order that the then undistilled liquid residue may not spew out of the still and even be carried over into the condenser, and clog it up so as to render it unusable. In practice, it will usually be found convenient to cut down the fire some 100° F. in advance of this temperature. Once this critical point is well passed, the fire may be increased and the distillation pushed on as rapidly as desired to its conclusion.

While the vapor coming off from the still may all be led into the iron pipe condenser, as above suggested, and all of the strictly vaporous portion thereof there condensed and collected as a liquid, a slightly different procedure is preferable. At the temperatures in the condenser appropriate for condensing other portions, the above-mentioned heavier portion of the oil vapor is of such thick, gummy consistency that it would tend to clog up the condenser very annoyingly. In order that this minor, heavy portion of the normally liquid products may be condensed and collected separately,—without entering the main condenser at all—the vapor from the still may first be chilled preliminarily, so to speak, to condense and separate out this heavier, high-boiling portion, and then further chilled in the condenser to condense other portions. While various provisions for this purpose may be made, a very simple and convenient one is to make the pipe leading from the still to the condenser of substantial length and to provide it with a trap. With this arrangement, this troublesome minor portion of the distillation products will be condensed by the cooling effect of the atmosphere on the pipe (which thus acts as a sort of auxiliary condenser), and will collect in the trap,— whence it can be drawn off from time to time and added to the liquid products from the condenser itself. The relatively high temperature of the pipe appropriate for causing separate condensation of the heavy portion of the vapor as above described (and naturally existing between still and trap) avoids any troublesome intermingling of the thick, gummy oil condensate while still very hot with accumulations of condensed water vapor from the distillation (which latter, as already stated, precedes the heavy oil vapor), since such water vapor naturally passes on through the hot pipe uncondensed. In cases where the trap cannot be located close enough to the still to obviate all risk of substantial collection of water and correspondingly low-boiling oil therein, it is advisable to draw off such accumulation from time to time before the troublesome heavy oil comes over, so as to avoid intermingling of the very hot heavy oil condensate with the water and the consequent sudden and dangerous evolution of steam,—which might at the least cause spewing of water and heavy oil out of the trap into the condenser or back into the still.

Besides taking care of the troublesome heavy oil vapor, the trap affords a measure of protection against the possibility of similar troubles from spewing over of the still into the condenser because of too rapid heating at the critical temperature above mentioned. Such a possibility, of course, is an additional reason for avoiding accumulation of water in the trap.

The truly gaseous portion of the distillation products will pass uncondensed through the condenser and be collected separately. The nitrogenous portion of this gas can be segregated and secured in the form of aqueous ammonia or of ammonium sulphate, by subjecting the gas to an aqueous or sulphuric acid scrubbing operation. The sulphuric reagent ordinarily to be preferred for such purposes is sulphuric acid, rather than sulphuric anhydride.

The gas thus scrubbed contains a relatively small amount of light hydrocarbon oil (not condensable by the temperatures generally attained in the ordinary water-cooling described above, and hence unrecoverable thereby) suspended or otherwise present therein: this may be allowed to remain in order to enhance the luminosity of the gas. It may, on the other hand, be separated out and secured by a scrubbing operation with a light oil (such as spindle oil) and subsequent distillation of this oil. If this oil-scrubbing is resorted to, it should preferably be done prior to the water or sulphuric scrubbing.

The final point to which the distillation is carried may vary somewhat, according to the products most desired, and the use or disposition to be subsequently made of them, etc. If the sole consideration is a maximum yield of oil and other direct distillation products, then the temperature of the solid coke eventually left in the still may be carried on up to a point where vapor or gas no longer comes off therefrom in any substantial amount. For a high total ultimate yield of nitrogenous products, on the other hand, the maximum temperature of the coke in the still should be regulated with reference thereto, and kept within the limit of nitrogen fixation, which for nitrogen extraction or recovery in such useful form as ammonia by combustion gasification of the coke is about the temperature of initial combustion or kindling of the latter, around 1000° F. Again, it is desirable that the final or maximum temperature be sufficient to yield coke that is dry and stable at such temperature, and also unmelting at the temperatures attained in incomplete combustion in a gas-producer, so that it may be gasified and its nitrogen recovered in that manner. Final temperatures ranging between some 850° F. and 1000° F. meet both these conditions, and even somewhat higher temperatures yield coke retaining a major proportion of the original nitrogen of the gilsonite unfixed and releasable for recovery. Final temperatures toward the lower limit of the range retain in the dry, solid coke the maximum proportion of nitrogen,—the maximum consistant with non-melting dryness, at any rate. While a temperature of 850° F., for the solid coke product of the distillation need not in practice be exceeded, I generally prefer a final temperature of about 900° F., as giving the best over all efficiency.

Taking representative percentages, the products into which the gilsonite is converted by the initial distillation are about as follows:

Light hydrocarbon, 2; ammonia ($NH_3$), free, .25; hydrocarbon fuel gas, 12.75; distillate, 55; coke, 30.

In the absence of the oil-scrubbing operation, the hydrocarbon fuel gas from the primary distillation is a mixture with an average heating value of as high as 930 B. t. u. per cubic foot. It contains methane and other hydrocarbons, so that it can be burned with a luminous flame or used to enrich and render luminous other fuel gas. Because of its hydrocarbon content, it may conveniently be distinguished as "hydrocarbon" fuel gas. Its average percentage composition is about as follows:

$CO_2$, 2.8; illuminant hydrocarbon, 6.6; O, .4; CO, 5.8; $CH_4$, 77.6; H, 4.5; N, 2.3.

The hydrocarbon oil distillate extracted from the gas by the oil-scrubbing operation is a very light, colorless, volatile liquid, vaporizing rapidly at ordinary temperature, and boiling from 80° F. to 200° F. It is suitable, in general, for the same purposes as similarly low-boiling hydrocarbons now on the market,—such as conversion into illuminating gas in small isolated plants.

The nitrogen-bearing coke collects in the bottom of the still and can be broken up and removed at the conclusion of the distillation, after it has cooled sufficiently. Unless the coke has been superheated beyond the favorable range indicated above, its unfixed nitrogen content is quite substantial, exceeding 1%, and, in fact, amounting to some 5 or 6%,—i. e., substantially some 80% of the total nitrogen content of the original gilsonite,—which is an unprecedently high nitrogen content and proportion of retention for a distillation coke from hydrocarbonaceous material. This nitrogenous coke may be gasified by incomplete combustion in a by-product gas-producer, and the nitrogenous portion of the resultant gas separated from the remainder and recovered (by means of a water or a sulphuric acid scrubbing operation) in the form of aqueous ammonia or of ammonium sulphate. As the ash content of the coke amounts to but a trifling 2 to 4%, it is desirable to mix a substantial proportion of foreign ash or other inert refractory material with this unprecedently rich coke as it is fed into the producer, to guard against melting out of the grates or other injury from excessive temperatures.

The significance of the above-mentioned upper temperature limit of 1000° F. for the coke during distillation and its coincidence with the initial combustion or kindling temperature of the latter may now be readily understood, by considering that in order to release nitrogenous products in the gas producer, it is naturally necessary to surpass the limit of the distillation,—during which the nitrogen amenable to all temperatures then attained was driven off in the distillation vapor. Such nitrogen as fails to come off at the lower temperatures attained in gas producer combustion continues its fixation under the higher temperatures there subsequently attained, and eventually comes off only in forms (other than ammonia) in which it is not usefully recoverable. It will also be seen that the lower the final or maximum temperature of the coke in the distillation the greater its possible nitrogen content,—which for the limit of distillation temperature above indicated will be unfixed and releasable for recovery as ammonia.

It will be apparent, therefore, that my technique of controlling the distillation with reference to releasability of nitrogen from the coke involves a sharp departure from ordinary practice in the treatment of hydrocarbonaceous materials, according to which distillation is pushed to the utmost limit with a view to getting out as much ammonia and oil, etc., as possible in the distillation vapors, and the coke left to take care of itself.

The remainder of the gas from the coke, after the scrubbing operation for extraction of ammonia, is a mixture of carbon monoxide, carbon dioxide, hydrogen, nitrogen, etc., suitable for use as fuel gas, and conveniently distinguishable as "carbonaceous" fuel gas. It has a fuel value of about 140 B. t. u. per cubic foot, and is practically non-luminous. A portion of this secondary fuel gas may be satisfactorily enriched and rendered luminous by mixture therewith of the primary "hydrocarbon" fuel gas. The average percentage composition of this secondary fuel gas is about as follows:

$CO_2$, 15; CO, 11; $CH_4$, 3.5; H, 24; N, 46; illuminant hydrocarbon, .5.

Practically all of the coke is used up in the gas-producer treatment,—the ash amounting to but a trifling 2–4%, as already noted.

The total liquid distillate (i. e., the mixture of the portions drawn off from the condenser and the trap) contains some 2 to 5% of water, and in this water is dissolved the nitrogenous content of the crude distillate above referred to, in the form of ammonia. This water may easily be eliminated and the aqueous ammonia segregated and secured by allowing the water to settle out in a settling tank. If desired, it may be converted into ammonium sulphate by means of sulphuric acid treatment such as indicated above, in connection with the scrubbing of the primary distillation gas.

As it comes from the settling tank, the primary crude distillate is a reddish brown oil with a green fluorescence, decidedly liquid at ordinary atmospheric temperatures, and having a specific gravity of about .875 at 60° F. After standing a while it loses its fluorescence and becomes dark brown to black, and absolutely opaque in sections of any considerable thickness. It has a characteristic pungent odor, difficult to define, and rather unpleasant. It begins to boil at about 140° F., and distills completely below 700° F; it flashes in the air at ordinary temperatures. It contains a very high percentage of unsaturated hydrocarbons,—usually about 60%,—as well as combined nitrogen in proportions (some 0.2%) that are likewise unprecendently high as compared with other mineral oils. It also contains a relatively high proportion of the wax hereinafter mentioned, amounting to some 1%. It is immiscible and insoluble in water, but completely soluble in benzole and carbonbisulphide, and miscible in all proportions with petroleum and petroleum products, turpentine, and pine oil. It presents a remarkable combination of paraffinic characteristics (in respect of cold test and wax content) with asphaltic ones (as regards relations of flash and viscosity to specific gravity) such as hereinafter particularly pointed out with reference to lubricating oils obtainable from it. It is useful as a flotation reagent for the treatment of ores by the flotation process, especially on account of its favorable ratio as between saturated and unsaturated hydrocarbons.

As already intimated above, this crude oil distillate is a highly complex material, capable of fractionation to an almost unlimited extent. The different products thus obtainable from it not only exhibit diverse properties which fit them for a great variety of industrial uses, but are suscepible of chemical treatment, purification, modification, and conversion to yield a great variety of new and useful substances and materials. In practice, it is most advantageous to initially separate the crude oil into a comparatively small number of fractions, by dry redistillation in a suitable heated iron or steel still. The redistillates may, if desired, be further purified by treatment with sulphuric acid and subsequent neutralization of the excess of reagent with alkali, such as caustic soda in aqueous solution. The following examples (wherein the temperatures given are the vapor temperatures in the still, unless otherwise stated) will sufficiently illustrate the most convienent methods of redistillation:

(1) Condense separately the vapors coming from the still up to 475° F. and from 475° F. to 600° F.,—subsequently drawing off as residuum the oil unvaporized at the latter temperature, or allowing it to remain and mix with the next charge of crude oil.

(2) Condense separately the vapors up to 475° F.; from 475° to 650° F.; and from 650° F. until the temperature of the material in the bottom of the still is about 850° F. By this procedure, an amount of coke equal to about 2% of the crude oil charge will be produced; it may be treated in the gas-producer along with that from the primary distillation. The percentages of the products thus obtained are about as follows:

Light oil, 24; medium oil, 35; heavy oil 36; coke 2.5; gas, and water, etc., 3.5.

In either of these cases, considerable destructive action occurs in the production of the higher fraction,— especially the last.

(3) Three fractions nearly similar to those described under (2) may be obtained at temperatures some 100° F. lower than those mentioned by carrying out the redistillation as described in U. S. Patent 877,620, granted Jan. 28, 1908, to Wells, blowing carbon dioxide or other insert permanent gas through the liquid in the still. In this case, the destructive action is much less. It is advantageous to pass the gas and vapor coming off through a filter of fuller's earth in the dome of the still, on its way to the condenser. A residuum of heavy oil will preferably be left in the still, as described under (1).

The light distillate produced in any of these ways is a yellow oil which becomes red on standing. After sulphuric purification, it may be desirable to redistill it in order to improve its color—leaving as residuum in the still the small portion of the oil not coming off below 425° F. The resultant reduced and purified product is a light, colorless, completely volatile oil; with mild " terpene " odor slightly suggesting turpentine; of specific gravity about .74 to .78; and of exceptionally high and diverse solvent capacity for substances used in the paint and varnish industry: specifically, its solvent capacity for varnish gums is substantially greater than that of the most similar petroleum derivatives. Its terpene characteristic is considerably more marked than in the case of refined petroleum, especially after prolonged standing.

The intermediate distillate oil is a yellow oil with green fluorescence when fresh; on standing it becomes first red and then, eventually, a deep reddish brown. Its specific gravity is about .870. It is capable of use as gas oil or fuel oil without sulphuric acid purification. It is more reactive to sulphonating reagents than the most similar mineral oil distillates from petroleum or other known hydrocarbonaceous materials. It is susceptible of sulphonation treatment with oil of vitriol and oleum (preferably after the preliminary sulphuric purification with a small percentage of oil of vitriol) to yield various useful products. These include a residual which after neutralization and redistillation is a thin, clear oil, substantially colorless, odorless, and tasteless; a sulphonation reaction oil of highly useful semi-drying properties; and a water-soluble product with the useful properties (hydrolizing, detergent, emulsifying) generally characteristic of true sulphonic substances. These last two products can be segregated by diluting the sulphonation sludge with an equal amount of water and allowing the solution to stand at a temperature of 150° F. and separate into layers by gravity. Of the resultant layers, the top comprises the reaction oil and the middle the aforesaid water-soluble sulphonic product, while the bottom comprises most of the unconsumed acid diluted with water. The separation is a matter of different specific gravities and preferential solubilities. For example, at a concentration of about 30° Baumé (corresponding to a specific gravity of 1.2609 at 60° F. for the diluted sulphuric acid, the water-soluble sulphuric product will be practically insoluble therein. For lower concentrations of the diluted sulphuric acid, the sulphuric product would be increasingly soluble in it, at higher concentrations, the layer of water-soluble sulphuric product would contain considerable sulphuric acid. The specific gravity of the sulphuric product is very close to 1.000, and that of the reaction oil is less than 1.000: hence the separation into layers as described.

The middle layer may be freed from contaminating organic impurity by neutralization, which sets the impurity free to rise to the surface and be removed,—or, in like manner, by free dilution with water.

The heavy distillate oil is a somewhat viscous reddish-yellow oil with green fluorescence when freshly prepared; on standing it becomes almost black,—or brown in a thin film. Its specific gravity is about .927. Both it and the residual oil redistillate (if produced) are suitable for use as flotation reagent without further treatment. The residual oil has a specific gravity of about .933.

Generally speaking, gilsonite oil fractions or redistillates (including the three typical ones just described) have the same strikingly high content of combined nitrogen and of unsaturated hydrocarbons as the crude primary distillate described above, and the higher boiling fractions contain the gilsonitic wax referred to. The peculiar combination of paraffinic and asphaltic properties is even more marked in the high boiling fractions than in the crude distillate itself.

The heavy distillate is suitable for the manufacture of lubricating oil. For this purpose, it may be purified by treatment with 3 to 10% of oil of vitriol; neutralized with caustic soda or other alkali; washed with water; and then chilled to about 32° F. and filter-pressed. This pressing removes from the oil a material which, after re-pressing and filtering through fuller's earth, becomes a merchantable wax, hard and crystalline, dark yellow to reddish in color, with a melting point of about 135° F. to 170° F., as compared with 120° F. for an illustrative ordinary paraffine. The pressed oil is then fractionated or reduced according to the particular variety of lubricant desired. The resultant refined products are viscous, yellowish red oils, with pronounced green fluorescence; they have specific gravities of 0.9 and upward; they give a flash test of not less than about 350° F.; they boil at temperatures exceeding 450° F., and, for the most part, above 600° F. They are stable against decomposition into products unsuited to lubrication under even the unfavorable conditions of internal combustion engine cylinder lubrication; and they are inert with respect to ordinary metals, so that they will not injure machine parts.

The anomalous character of gilsonitic oils already referred to is strikingly apparent from comparison of the properties of a typical gilsonitic lubricating oil produced as just described with those of commercial petroleum lubricating oils:

|  | Gilsonitic | California asphaltic | Paraffinic | |
|---|---|---|---|---|
|  |  |  | (1) | (2) |
| Gravity Baumé | 24.8 | 24.3 | 31 | 25.9 |
| Specific gravity | .9044 | .9073 | .8596 | .8980 |
| Flash test | 370 | 395 | 400 | 370 |
| Viscosity at 100° F | 212 | 319 | 160 | 173 |
| Viscosity at 212° F | 47 | 46 | 40 | 42 |
| Cold test | 35 | 0 | 24 | 33 |

Thus it will be observed that for similar gravities the asphaltic and gilsonitic lubricating oils have flash points below those for even lighter paraffinic oils; while the gilsonitic oil has viscosities which, if not asphaltic, are intermediate between those of paraffinic and asphaltic oils. The cold test of the gilsonitic lubricating oil and the wax obtained in its production as described above indicate its paraffinic character.

The unconsumed portion of the sulphuric acid used in the various purifying and sulphonation treatments above described can be used as a reagent for the segregation of nitrogenous products from the primary gas, liquid, and coke products as above set forth. Sulphonation of the intermediate distillate described above will afford enough such unconsumed acid for this purpose.

Having thus described my invention, I claim:

1. A gilsonitic oil; of specific gravity about .875 at 60° F.; reddish-brown with green fluorescence when fresh, but losing such fluorescence and turning reddish brown to black after standing; boiling from 140° F. to 700° F. and flashing in air at ordinary temperatures; of unpleasant pungent odor; containing high melting wax and unsaturated hydrocarbons in high proportion as compared with petroleum; and yielding by fractionation a light fraction with terpene odor, and a heavy fraction itself yielding lubricating oils of paraffinic character having the relations of flash to specific gravity generally characteristic of asphaltic lubricating oils.

2. A gilsonitic oil; when fresh, reddish brown with green fluorescence, and turning dark brown to black on standing; flashing in air at ordinary temperatures; of unpleasant pungent odor; containing wax and also nitrogen in substantial proportions; destructively affected to a considerable extent in the later stages of redistillation, with ultimate yield of coke; and also yielding, by fractionation and refinement, oil with terpene odor and heavier lubricating oil with paraffinic cold test characteristics and asphaltic relations of flash to specific gravity.

3. A gilsonitic oil of specific gravity about .875 at 60° F.; boiling from 140° F. to 700° F., and flashing in air at ordinary temperatures; of unpleasant pungent odor; containing high melting wax, and also nitrogen and unsaturated hydrocarbons in high proportions as compared with petroleum; and yielding, by fractionation and refinement, light oil with terpene odor more marked than that of refined petroleum.

4. A gilsonitic oil containing hard, high melting crystalline wax; and yielding, by fractionation and refinement with sulphuric acid lubricating oil of paraffinic character with asphaltic relations of flash to specific gravity.

5. A gilsonitic oil of pungent odor; containing nitrogen and unsaturated hydrocarbons in high proportions as compared with petroleum; and yielding, by redistillation and refinement with sulphuric acid, oil with terpene odor more marked than that of refined petroleum.

In testimony whereof, I have hereunto signed my name at Maurer N. J., this 16th day of Sept. 1922.

CHARLES N. FORREST.